United States Patent
Regev (10) Patent No.: US 11,216,437 B2
(45) Date of Patent: Jan. 4, 2022

(54) SYSTEM AND METHOD FOR REPRESENTING QUERY ELEMENTS IN AN ARTIFICIAL NEURAL NETWORK

(71) Applicant: Sisense Ltd., Ramat Gan (IL)

(72) Inventor: Nir Regev, Beit Guvrin (IL)

(73) Assignee: Sisense Ltd., Ramat Gan (IL)

( * ) Notice: Subject to any disclaimer, the term of this patent is extended or adjusted under 35 U.S.C. 154(b) by 290 days.

(21) Appl. No.: 16/659,350

(22) Filed: Oct. 21, 2019

(65) Prior Publication Data

US 2020/0104287 A1 Apr. 2, 2020

Related U.S. Application Data

(63) Continuation-in-part of application No. 15/858,957, filed on Dec. 29, 2017.

(60) Provisional application No. 62/748,469, filed on Oct. 21, 2018, provisional application No. 62/545,053, filed on Aug. 14, 2017, provisional application No. 62/545,050, filed on Aug. 14, 2017, provisional application No. 62/545,058, filed on Aug. 14, 2017, provisional application No. 62/545,046, filed on Aug. 14, 2017.

(51) Int. Cl.
  *G06F 16/22* (2019.01)
  *G06F 16/25* (2019.01)
  *G06N 3/04* (2006.01)

(52) U.S. Cl.
  CPC ...... *G06F 16/2282* (2019.01); *G06F 16/2237* (2019.01); *G06F 16/258* (2019.01); *G06N 3/04* (2013.01)

(58) Field of Classification Search
  CPC .............. G06F 16/2282; G06F 16/2237; G06F 16/258; G06N 3/04
  USPC .......................................................... 706/17
  See application file for complete search history.

(56) References Cited

U.S. PATENT DOCUMENTS

| | | | |
|---|---|---|---|
| 5,111,531 A | 5/1992 | Grayson et al. | |
| 5,515,477 A | 5/1996 | Sutherland | |
| 6,108,648 A | 8/2000 | Lakshmi et al. | |
| 7,181,438 B1 * | 2/2007 | Szabo ................ | G06F 21/6245 |

(Continued)

FOREIGN PATENT DOCUMENTS

| | | |
|---|---|---|
| CN | 106547828 A | 3/2017 |
| WO | 2017176356 A2 | 10/2017 |
| WO | 2018200979 A1 | 11/2018 |

OTHER PUBLICATIONS

Wang, et al., "Relevance feedback technique for content-based image retrieval using neural network learning", Proceedings of the Fifth International Conference on Machine Learning and Cybernetics, Dalian, Aug. 13-16, 2006 (Year: 2006).*

(Continued)

*Primary Examiner* — Tsu-Chang Lee
(74) *Attorney, Agent, or Firm* — M&B IP Analysts, LLC (57) ABSTRACT

A system and method for representing query elements in an artificial neural network. The method includes generating a translation table based on a plurality of query elements, wherein the translation table maps a plurality of vectors to the plurality of query elements, wherein each of the plurality of vectors is mapped to at least one query element of the plurality of query elements, wherein a number of distinct query elements among the plurality of query elements is greater than a number of distinct vectors among the plurality of vectors.

24 Claims, 7 Drawing Sheets

(56) References Cited

U.S. PATENT DOCUMENTS

| | | | |
|---|---|---|---|
| 9,514,389 | B1 | 12/2016 | Erhan et al. |
| 10,311,372 | B1 | 6/2019 | Hotchkies et al. |
| 10,635,680 | B2 | 4/2020 | Jiang et al. |
| 10,706,354 | B2 * | 7/2020 | Corvinelli ............... G06N 3/08 |
| 10,713,594 | B2 | 7/2020 | Szeto et al. |
| 10,878,334 | B2 | 12/2020 | Lindner |
| 10,929,751 | B2 | 2/2021 | Ehrman et al. |
| 10,977,581 | B2 | 4/2021 | Maor et al. |
| 11,115,463 | B2 | 9/2021 | Cudworth et al. |
| 2004/0093315 | A1 | 5/2004 | Carney |
| 2007/0168329 | A1 * | 7/2007 | Haft .................... G06F 16/2462 |
| 2013/0117257 | A1 | 5/2013 | Meijer et al. |
| 2014/0156633 | A1 | 6/2014 | Duan et al. |
| 2014/0344203 | A1 | 11/2014 | Ahn |
| 2015/0100955 | A1 | 4/2015 | Chen et al. |
| 2015/0278709 | A1 | 10/2015 | Zeng et al. |
| 2016/0162781 | A1 | 6/2016 | Lillicrap et al. |
| 2017/0109355 | A1 | 4/2017 | Li et al. |
| 2017/0357896 | A1 | 12/2017 | Tsatsin et al. |
| 2018/0082183 | A1 | 3/2018 | Hertz et al. |
| 2018/0157758 | A1 | 6/2018 | Arrizabalaga et al. |
| 2018/0329951 | A1 * | 11/2018 | Yu ..................... G06F 16/24545 |
| 2018/0341862 | A1 | 11/2018 | Ehrman |
| 2018/0357240 | A1 | 12/2018 | Miller et al. |
| 2019/0180195 | A1 | 6/2019 | Terry et al. |
| 2020/0125950 | A1 | 4/2020 | Regev |
| 2020/0142888 | A1 | 5/2020 | Alakuijala et al. |

OTHER PUBLICATIONS

Anagnostopoulos, et. al., "Efficient Scalable Accurate Regression Queries in In-DBMS Analytics", IEEE International Conference on Data Engineering (ICDE), 2017.

Doulamis, et al., "On-Line Retrainable Neural Networks: Improving the Performance of Neural Networks in Image AnalysisProblems", IEEE Transactions on Neural Networks, vol. 11, No. 1, Jan. 2000 (Year: 2000).

Melucci, Massimo, "Impact of Query Sample Selection Bias on Information Retrieval System Ranking" IEEE International Conference on Data Science and Advanced Analytics (DSAA), Oct. 17-19, 2016.

Yang, et. al., "A Variance Maximization Criterion for Active Learning", Pattern Recognition Library, Jun. 23, 2017.

Yuan, et. al., "Optimizing Batch Linear Queries under Exact and Approximate Differential Privacy," ACM Transactions on Database Systems, vol. 40, No. 2, Article 11, Jun. 2015.

Brownlee, Jason, "A Gentle Introduction to Statistical Data Distributions" A Stata Press Publication: StataCorp LP, Jun. 8, 2018, pp. 1-20.

First Foreign Office Action for European Application No. 17921683.3, dated: Jun. 17, 2021, European Patent Office.

The International Search Report and The Written Opinion of the International Searching Authority for PCT/US2017/069071, dated Apr. 26, 2018, ISA/RU, Moscow, Russia.

The International Search Report and the Written Opinion for PCT/US2017/069069, ISA/RU, Moscow, Russia, dated Jun. 7, 2018.

Yegulalp, Serdar, "Machine learning comes to your browser via JavaScript", InfoWorld, Aug. 2, 2017.

Chang et al., "Active Bias: Training More Accurate Neural Networks by Emphasizing High Variance Samples", arXiv: 1704.07433v2, May 22, 2017, pp. 1-15.

Cohen et al., "A Minimal Variance Estimator for the Cardinality of Big Data Set Intersection" arXiv: 1606.00996v1., Jun. 3, 2016.

Cohen et al., :A Minimal Variance Estimator for the Cardinality of Big Data Set Intersection, KDD 2017 Research Paper, Aug. 13-17, 2017, pp. 95-103.

Hendrycks et al., "Adjusting for Dropout Variance in Batch Normalization and Weight Initialization", arXiv: 1607.02488v2, Mar. 23, 2017, pp. 1-10.

Ivanov et al., "Adaptive Cardinality Estimation", arXiv: 1711.08330v1, Nov. 22, 2017, pp. 1-12.

Katharopoulos et al., "Biased Importance Sampling for Deep Neural Network Training", arXiv: 1706.00043v1, Sep. 13, 2017, pp. 1-12.

Loshchilov et al., "Online Batch Selection for Faster Training of Neural Networks", arXiv: 1511.06343v4, Apr. 25, 2016, pp. 1-20.

Wang et al., "Synthesizing Highly Expressive SQL Queries from Input-Output Examples", Jun. 2017, pp. 452-466.

Xiong et al., "End-to-End Neural Ad-hoc Ranking with Kernel Pooling", arXiv:1706.06613v1, Jun. 20, 2017.

Xu et al., "SQLNet: Generating Structured Queries from Natural Language without Reinforcement Learning", arXiv: 1711.0443v1, Nov. 13, 2017, p. 1-13.

* cited by examiner

| REPRESENTATION | INPUT |
|---|---|
| 0000 | 0 |
| 0001 | 1 |
| 0010 | 2 |
| 0011 | AND |
| 0100 | 4 |
| 0101 | 5 |
| 0110 | 6 |
| 0111 | 7 |
| 1000 | 8 |
| 1001 | 9 |
| 1010 | 10 |
| 1011 | IDENTIFIER |
| 1100 | OR |
| 1101 | SUM |
| 1110 | AVERAGE |
| 1111 | COUNT |

FIG. 5A

| REPRESENTATION | INPUT |
|---|---|
| 0000 | 0 |
| 0001 | 1 |
| 0010 | 2 or AND |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 or IDENTIFIER |
| 1100 | 12 or OR |
| 1101 | 13 or SUM |
| 1110 | 14 or AVERAGE |
| 1111 | 15 or COUNT |

SYSTEM AND METHOD FOR REPRESENTING QUERY ELEMENTS IN AN ARTIFICIAL NEURAL NETWORK

CROSS-REFERENCE TO RELATED APPLICATIONS

This application claims the benefit of U.S. Provisional Application No. 62/748,469 filed on Oct. 21, 2018. This application is also a continuation-in-part of U.S. patent application Ser. No. 15/858,957 filed on Dec. 29, 2017, now pending, which claims the benefit of the following applications:

U.S. Provisional Application No. 62/545,046 filed on Aug. 14, 2017;
U.S. Provisional Application No. 62/545,050 filed on Aug. 14, 2017;
U.S. Provisional Application No. 62/545,053 filed on Aug. 14, 2017; and
U.S. Provisional Application No. 62/545,058 filed on Aug. 14, 2017.

All of the applications referenced above are herein incorporated by reference.

TECHNICAL FIELD

The present disclosure relates generally to artificial neural networks (ANNs), and more specifically to representing queries for processing by ANNs.

BACKGROUND

It is becoming increasingly more resource intensive to produce useful results from the growing amount of data generated by individuals and organizations. In particular, business organizations can generate petabytes of data and could therefore benefit greatly from mining such data to extract useful insights from their generated data that is automatically gathered and stored in the course of usual business operations.

Existing solutions for gaining insight from data include querying a database storing the data to get a specific result. For example, a user may generate a query (e.g., an SQL query) and the query is sent to a database management system (DBMS) that executes the query on one or more tables stored in the database. However, with organizations relying on a multitude of vendors for managing their data, each of which uses their own technology for storing data, retrieving useful insights from data is becoming increasingly complex. Additionally, queries may take several minutes, or even hours, to complete when applied to vast amounts of stored data.

To address these issues, some existing solutions attempt to accelerate access to the databases. For example, one solution includes indexing data stored in databases. Another existing solution includes caching results of frequent queries. Yet another existing solution includes selectively retrieving results from the database so that the query can be served immediately. However, while these database optimization and acceleration solutions are useful in analyzing databases of a certain size or known data sets, they can fall short of providing useful information when applied to large databases and unknown data sets, which may include data that an indexing or caching algorithm has not been programmed to process.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for representing query elements in an artificial neural network. The method comprises: generating a translation table based on a plurality of query elements, wherein the translation table maps a plurality of vectors to the plurality of query elements, wherein each of the plurality of vectors is mapped to at least one query element of the plurality of query elements, wherein a number of distinct query elements among the plurality of query elements is greater than a number of distinct vectors among the plurality of vectors.

Certain embodiments disclosed herein also include a non-transitory computer readable medium having stored thereon causing a processing circuitry to execute a process, the process comprising: generating a translation table based on a plurality of query elements, wherein the translation table maps a plurality of vectors to the plurality of query elements, wherein each of the plurality of vectors is mapped to at least one query element of the plurality of query elements, wherein a number of distinct query elements among the plurality of query elements is greater than a number of distinct vectors among the plurality of vectors.

Certain embodiments disclosed herein also include a system for representing query elements in an artificial neural network. The system comprises: a processing circuitry; and a memory, the memory containing instructions that, when executed by the processing circuitry, configure the system to: generate a translation table based on a plurality of query elements, wherein the translation table maps a plurality of vectors to the plurality of query elements, wherein each of the plurality of vectors is mapped to at least one query element of the plurality of query elements, wherein a number of distinct query elements among the plurality of query elements is greater than a number of distinct vectors among the plurality of vectors.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for representing query elements in an artificial neural network. More specifically, the disclosed embodiments provide reduced representations of query elements. Reducing the representation includes mapping, via a translation table, query elements to vectors such that there are more query elements than vectors (i.e., the number of distinct query elements is greater than the number of distinct representations). Each vector is a representation such as, but not limited to, a binary representation.

A reduced representation translation table is generated such that one or more query elements are not mapped to any vector, more than one query element is mapped to the same vector (e.g., an expression and a value mapped to the same vector), or both. The query elements may include, but are not limited to, predicates, expressions, variables, values for variables, query results, and the like. To this end, various disclosed embodiments provide techniques for determining whether to use reduced representations.

The disclosed embodiments also allow for reducing data loss when using reduced representations. To this end, the disclosed embodiments include techniques for determining which query element(s) should have reduced representations. In particular, query elements with lower occurrence probabilities may be selected such that the likelihood of loss of data during query processing is minimized.

Additionally, in some embodiments, predicates and expressions may be assigned to vectors such that predicates and expressions with the highest occurrence probabilities are mapped to the same vectors as respective variable values having the lowest occurrence probabilities. This may further decrease the likelihood that the reduced representations affect query processing.

Figure 1:
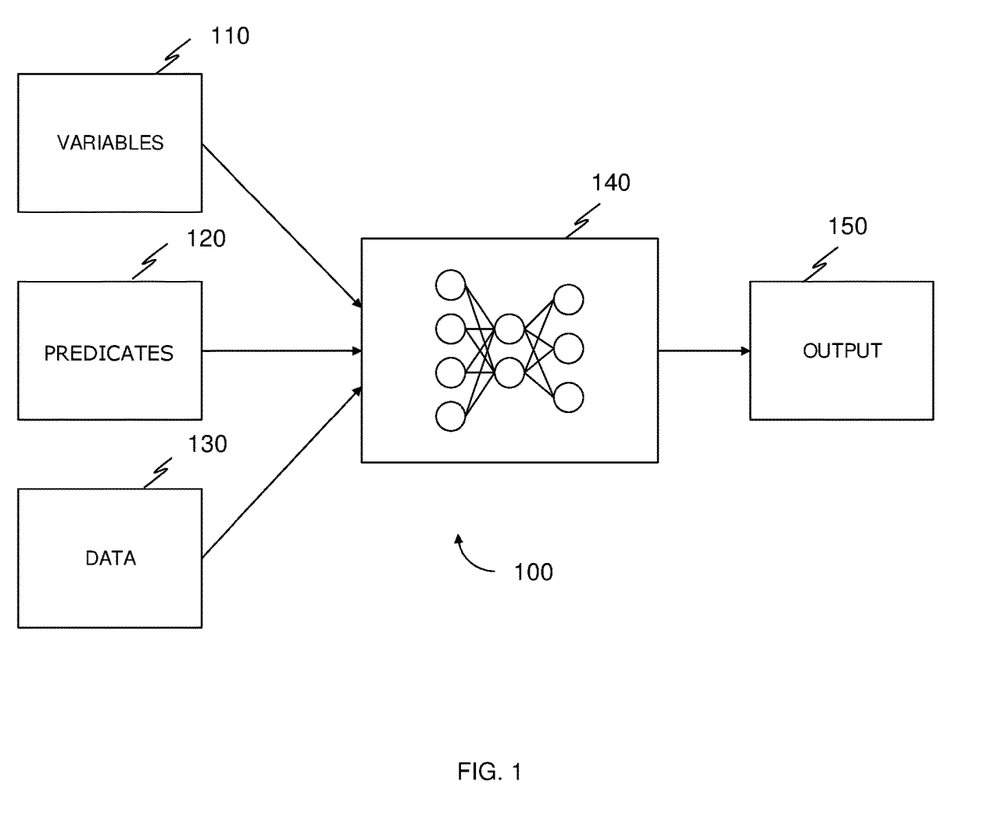
FIG. 1 is a flow diagram illustrating generation of approximation results by a neural network system (NNS).

FIG. 1 is a flow diagram 100 illustrating generation of approximation results by a neural network (NN). In the flow diagram 100, variables 110, predicates 120, and data 130 are input to a neural network 140 in order to produce an output 150. In an embodiment, the variables 110, predicates 120, and data 130 are derived from a database query. In this example, predicates of a query are shown for simplicity, but it should be readily understood that the teachings herein can apply to any query element such as, but not limited to, statements, clauses, etc.

The variables 110 may represent, for example, columns of a table stored in a database (not shown) such that each column is represented by one of the variables 110. The data 130 includes values of the variables and may be, for example, included in the columns represented by the variables 110. As a non-limiting example, a column listed as "first_names" may include multiple first names. Thus, the column "first_names" is represented by a variable 110 and the first names included in the columns are at least part of the data 130. The data 130 may include dimensions, measures, or both.

The predicates 120 are used for querying data. Each predicate 120 is a function that takes an input argument and outputs a truth value (i.e., true or false). To this end, a predicate 120 describes a property of a subject and includes an expression used to determine if the query will return a true or false result. An example predicate is "CONTAINS". Non-limiting examples of expressions, statements, and clauses include "AND," "OR," "SELECT," "FROM", and the like.

The predicates 120 are not necessarily unique, for example, to a particular table or other data structure. In contrast, the variables 110 are typically unique to the respective tables or data structures they are included in.

Based on the inputs 110, 120, and 130, the neural network 140 is configured to produce an output including approximation results for the database query. The neural network 140 includes nodes having respective weights represented by a model of the neural network (nodes, weights, and model not shown in FIG. 1).

Figure 2:
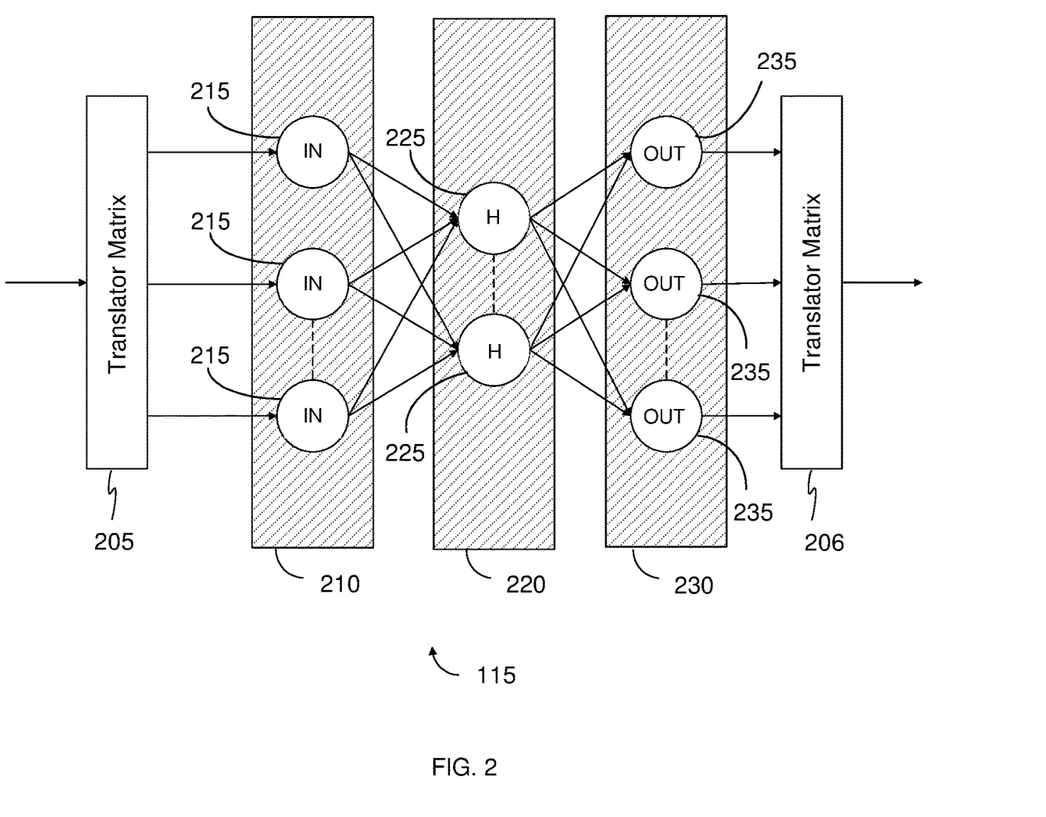
FIG. 2 is a schematic illustration of a neural network for generating approximation results for a database query according to an embodiment.

FIG. 2 is a schematic illustration of the neural network 115 for generating approximation results for a database query according to an embodiment. The neural network 115 includes a first translator matrix 205, an input layer 210, a hidden layer 220, an output layer 230, and a second translator matrix 206.

Each of the layers 210, 220, and 230, includes respective neurons 215, 225, and 235. Each neuron 215, 225, or 235 is configured to apply a function to inputs and to send the output of the function forward (e.g., to another neuron or to the second translator matrix 206). To this end, each neuron 215, 225, or 235

The first translator matrix 205 is a numerical translator matrix configured to receive a query and translate it into a numerical representation which may be provided as inputs to input neurons 215 of the input layer 210. Outputs from each of the layers 210, 220, and 230 are provided as inputs to the next layer in order (e.g., the order shown in FIG. 2) or to the translator matrix 206 (i.e., outputs of the output layer 230 are provided to the translator matrix 206).

The translator matrix 206 is configured to translate the output of the output layer 230 from a numerical representation to a query result. The result of the translation by the translator matrix 206 may then be sent to, for example, a user node (not shown) which sent the original query translated by the translator matrix 205.

In an embodiment, the neural network 115 may be stored in one or more user devices, artificial neural network (ANN) systems, and the like after training. An example implementation in which the neural network 115 is stored in an ANN system is described further below with respect to FIG. 3. Storing the neural network 115 in a user device may allow, for example, for providing responses to queries by the user device faster than requiring the user device to communicate with a database in order to obtain the query responses.

In some embodiments, the neural network 115 may include or be associated with a version identifier indicating a relative amount of training the neural network 115 has received. For example, a higher version number (e.g., 9.0)

may indicate that the neural network is more up-to-date (i.e., better trained) than another neural network with a lower version number (e.g., 5.0). In an example implementation, the highest version number of the neural network is always stored in an ANN system, and a user device storing the neural network may periodically check to see if a newer version of the neural network is available. In another example implementation, the ANN system storing the highest version number of the neural network may push notifications to user devices to indicate that a newer version of the neural network is available.

In some embodiments, an ANN system may store multiple neural networks, where each neural network is trained on different datasets, different tables, different columns of the same table, combinations thereof, and the like. The different datasets, columns, or tables may partially overlap.

It should be noted that a single hidden layer 220 is shown in FIG. 2 merely for simplicity purposes, and that additional hidden layers may be utilized without departing from the disclosed embodiments. When multiple hidden layers are utilized, outputs of the input layer 210 may be provided to a first hidden layer in an order of hidden layers, and subsequent intermediate outputs may be provided to the next hidden layer in the order until outputs of the last hidden layer in the order are provided to the output layer 230.

Figure 3:
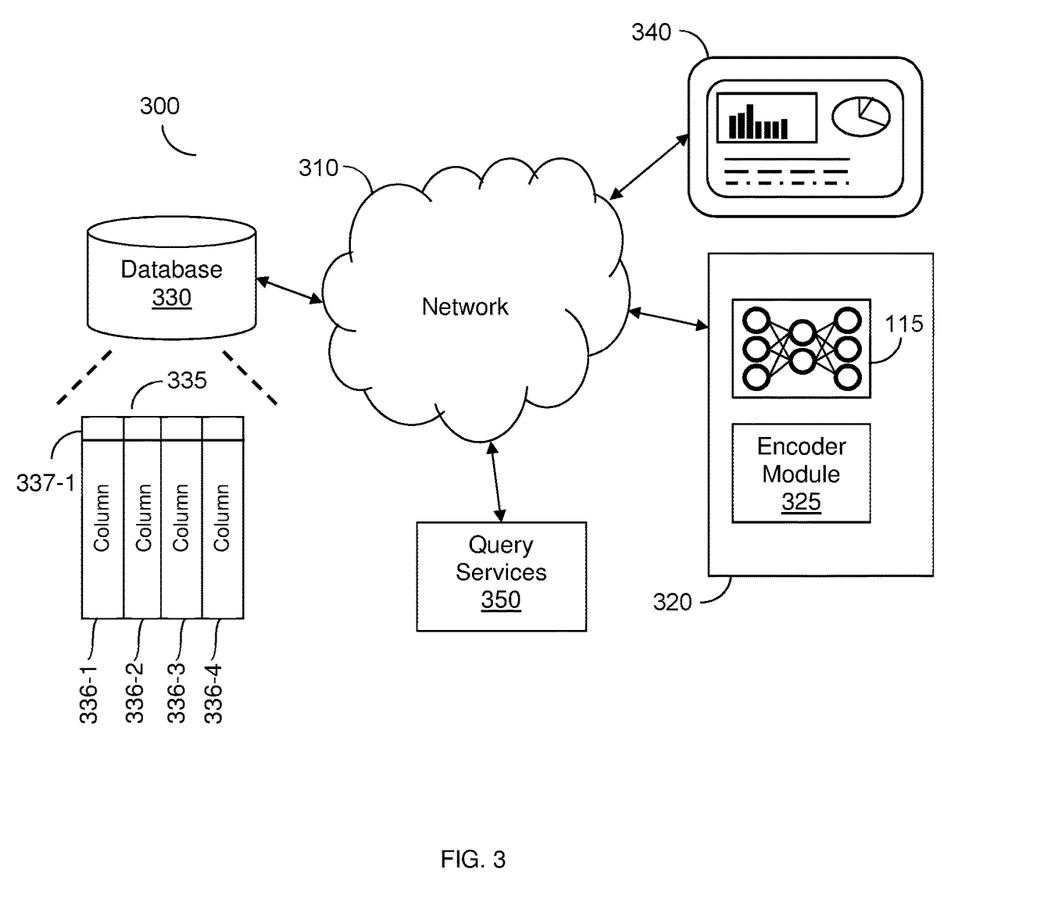
FIG. 3 is a network diagram utilized to describe various disclosed embodiments.

FIG. 3 is a network diagram 300 including an artificial neural network (ANN) system utilized to describe various disclosed embodiments. In the network diagram 300, an artificial neural network (ANN) system 320, a database 330, a user device 340, and query services 350 communicate over a network 310. The network 310 may be, but is not limited to, a wireless, cellular or wired network, a local area network (LAN), a wide area network (WAN), a metro area network (MAN), the Internet, the worldwide web (WWW), similar networks, and any combination thereof.

The ANN system 320 includes a neural network such as the neural network 115 and an encoder module 325. The neural network 115 utilizes inputs including variables, predicates, and data, and provides outputs as described above with respect to FIG. 1.

In an embodiment, the ANN system 320 is configured to train the neural network 115 using a table 335 stored in the database 330. The table 335 includes columns 336-1 through 336-4 (referred to individually as a column 336 and collectively as columns 336 for simplicity), where each column has a corresponding identifier 337 (e.g., the identifier 337-1 shown in FIG. 3 corresponds to the column 336-1). Each column 336 includes data elements such as variables which inherently have variance.

In some embodiments, the ANN system 320 is configured to train the neural network 115 using a subset of the columns 336. In a further embodiment, the ANN system 320 may be configured to train multiple neural networks (not shown), each based on a respective subset of the columns 336. Neural networks may be trained on different subsets of the columns 336, the same subset of the columns 336, or both (i.e., some neural networks may be trained based on different subsets and some neural networks may be trained based on the same subset). Training different neural networks based on the same subset of the columns 336 provides neural networks with different accuracies with respect to particular queries.

In an example implementation, the user device 340 is configured to send queries from a user (not shown) to the query services 350 and to display results of the queries received from the query services 350. The query services 350 are configured to direct queries sent by the user device 340 for execution on the database 330, the ANN system 320, and the like. The query services 350 are further configured to receive results from the queries and to send the results to the user device 340.

When a query is sent to the ANN system 320 by the query services 350, the neural network 115 uses a translator matrix as described above to convert the query into a numerical representation which can then be processed by the neural network. As a non-limiting example, a query including sixteen variable values (e.g., characters, numbers, symbols, combinations thereof, etc.) may be represented by four bits. The query elements may include, but are not limited to, query elements representing identifiers of columns 336 (e.g., the identifier 337-1) as well as query elements representing expressions (e.g., "AND," "OR," and the like).

In an embodiment, the neural network is configured to receive a binary input up to a certain size (e.g., 16 bits, or $2^{16}$). To this end, when the number of distinct query elements that need to be represented is above this size, the ANN system 320 is configured to reduce the size of the representation (i.e., by generating a translation table such that there are more distinct query elements than distinct vectors in the translation table). Reducing the size of the representation includes generating a translation table that either does not map some of the query elements to vectors or maps more than one query element to the same vector. Each query element is a variable, a variable value, a predicate, an expression, or a query result. Thus, more than one query element being mapped to the same vector may include, for example, two variable values, a variable value and a predicate, a variable value and an expression, and the like.

It should be noted that whether to use reduced representations is based on the number of distinct query elements that need to be represented, and is not necessarily based on the range of possible query element values. As a non-limiting example, if query element values may range from 1 to 1010, but the only query elements that are to be represented have values between 1 and 10 or between 1000 and 1010, then only 20 distinct query elements (i.e., not 1010) need to be represented such that an 8-bit representation is sufficient to represent the query elements.

The ANN system 320 may be configured to map predicates, expressions, or both, randomly to vectors within the translation table, at the beginning of the translation table (i.e., before any entries mapping other types of query elements such as variable values), at the end of the translation table (i.e., after any entries mapping other types of query elements), in a serial manner, in a non-serial manner, and the like.

The ANN system 320 may be further configured to reduce representations for query elements based on occurrence probabilities (i.e., likelihood that the query elements are used based on historical use). To this end, in an embodiment, the ANN system 320 is configured to determine a probability of occurrence for each query element based on a set of training queries (e.g., training queries used to train the neural network 115). In a further embodiment, representations are reduced for query elements having lower probabilities of occurrence before query elements having higher probabilities of occurrence. This selection reduces data loss by reducing representations for query elements that are less likely to be used and, therefore, less likely to cause data loss when their representations are reduced as compared to more frequently occurring query elements.

As a non-limiting example, if data in the column 135-1 includes variable values having values between zero and ten, then 5 bits would be needed for a full representation of the variable values. However, processing 5 bits requires more computing resources (e.g., processing power, memory, etc.) than 4 bits would require. When the ANN system 310 determines that one or more of the query elements does not appear at all or rarely (e.g., relative to another value, below a threshold number or proportion of times, etc.), the ANN system 310 may determine that a reduced representation may be used in order to allow for using a smaller representation size (e.g., fewer bits). For example, when the number of query elements that occur rarely is below a threshold, the next smallest representation size may be utilized. The reduced representation may be realized by mapping query elements to vectors such that one or more query elements are not mapped to vectors or such that more than one query element is mapped to the same vector.

For example, if the variable value 3 does not actually appear in the table, the ANN system 310 may represent the variable value 3 using a binary combination representing both the variable value "3" and the expression "AND." As another example, if the variable value "3" appears rarely compared to the variable value 5, then the ANN system 320 may either use a larger number of bits to represent the values or otherwise determine how to respond. An example use of such a binary combination is shown in FIG. 5B.

Figure 5A:
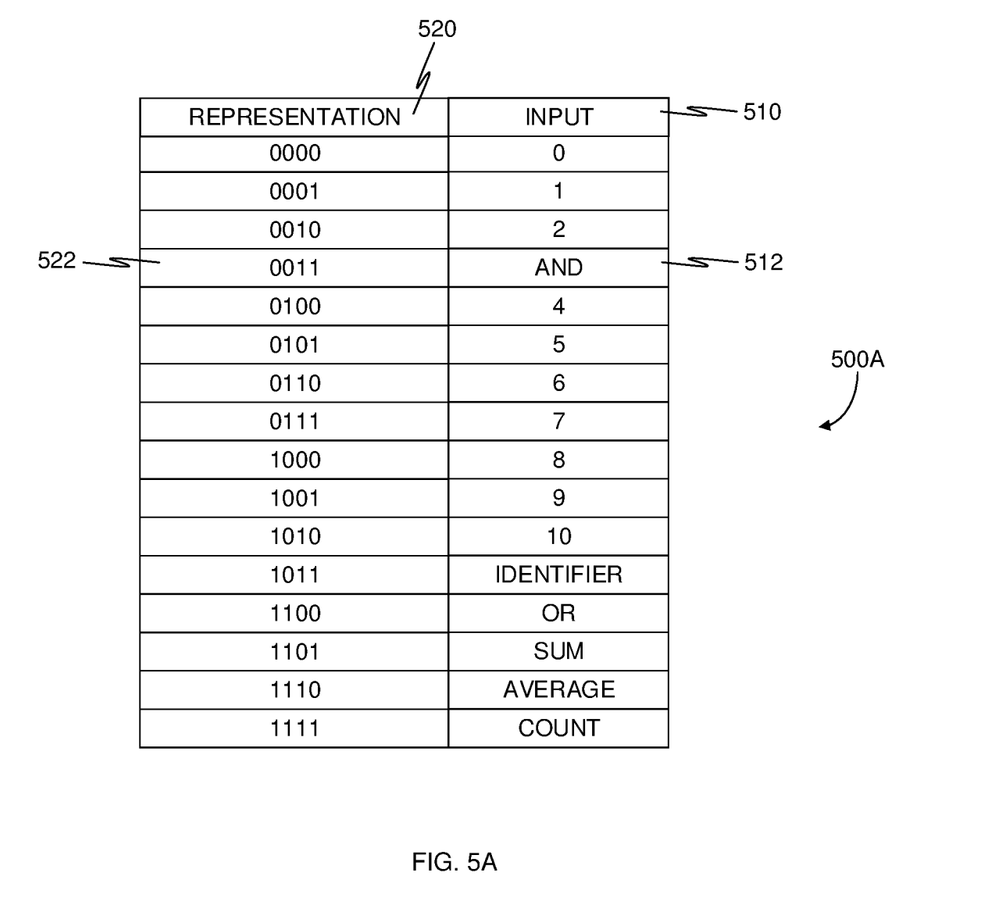
FIGS. 5A-B are translation tables utilized to describe reduced representations of query elements.
Figure 5B:
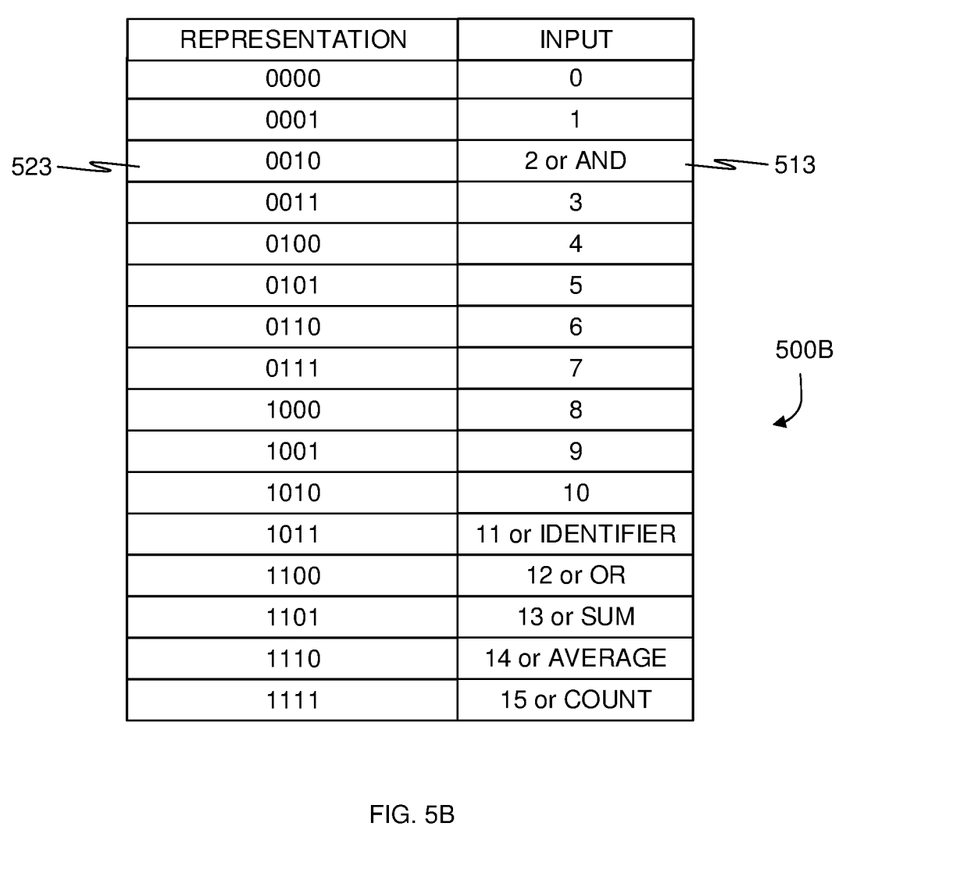

FIGS. 5A-B are example illustrations of translation tables utilized to describe reduced numerical representations of query elements in accordance with the disclosed embodiments. In the example translation tables shown in FIGS. 5A-B, it has been determined that one of the query elements is not used or is otherwise rare enough that it does not warrant its own entry in the translation table. The example translation tables shown in FIGS. 5A-B may be used to train a neural network or to translate queries into inputs for a neural network.

Each of FIGS. 5A-B show an example translation table used to convert inputs 510 into numerical representation vectors 520. In the example translation tables shown in FIGS. 5A-B, the numerical representation vectors 520 are 4-bit representations.

In FIG. 5A, the reduction of numerical representations includes mapping the "AND" expression 512 to one of the 4-bit vectors instead of the query element 3. The expression 512 is mapped to the vector 522, which would otherwise have been mapped to the variable value "3".

In FIG. 5B, the reduction of numerical representations includes mapping data items 513 including both the variable value "2" and the expression "AND" to a vector 523. Thus, multiple query elements (in this example, a variable value and an expression) 513 are mapped to the same vector 523. FIG. 5B also shows additional instances of multiple query elements being mapped to the same vector with respect to variable values "11" through "15".

Returning to FIG. 3, the encoder module 325 is configured to generate translation tables as described herein. The translation tables are used to convert input query elements into numerical representations thereof. When the ANN system 320 determines that a reduced representation should be used, numeri query elements are mapped to vectors such that the reduced representation is realized (e.g., by to the same vector or by not mapping a query element to any vector).

It should be noted that 4 columns 336-1 through 336-4 are shown in FIG. 3 merely for example purposes, and that any number of columns greater than 1 may be included in the table 325 without departing from the scope of the disclosure.

Figure 4:
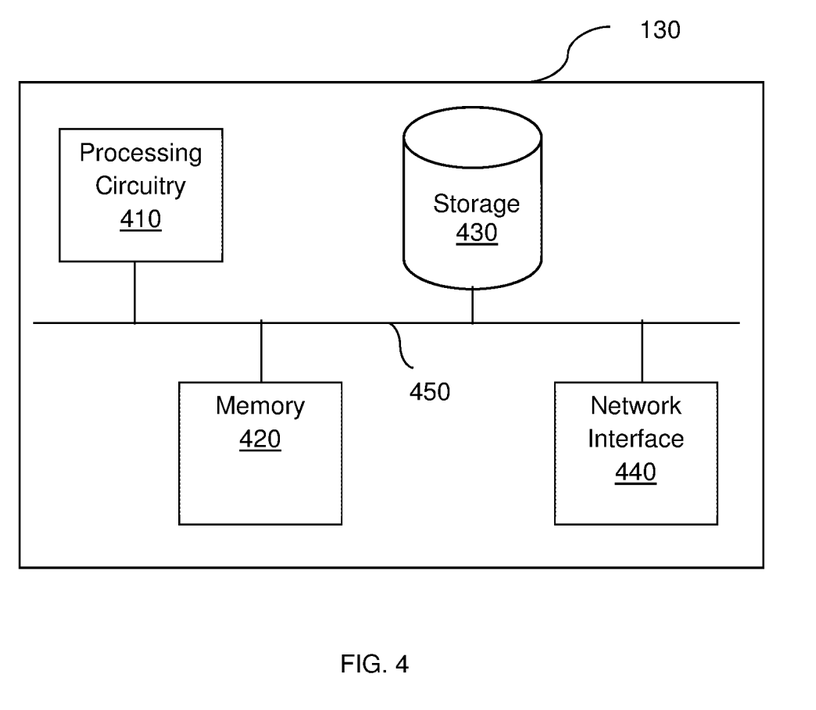
FIG. 4 is a schematic illustration of an ANN system according to an embodiment.

FIG. 4 is an example schematic diagram of an artificial neural network (ANN) system 320 according to an embodiment. The ANN system 320 includes a processing circuitry 410 coupled to a memory 420, a storage 430, and a network interface 440. In an embodiment, the components of the ANN system 320 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

In an embodiment, the storage 430 may further include one or more neural networks trained on queries for a database table.

The network interface 440 allows the ANN system 320 to communicate with the query services 350 for the purpose of, for example, receiving queries, sending results of queries, and the like. Further, the network interface 440 allows the ANN system 320 to communicate with the database 330 for the purpose of obtaining data to be used as query results.

It should be understood that the embodiments described herein are not limited to the specific architecture illustrated in FIG. 4, and other architectures may be equally used without departing from the scope of the disclosed embodiments.

Figure 6:
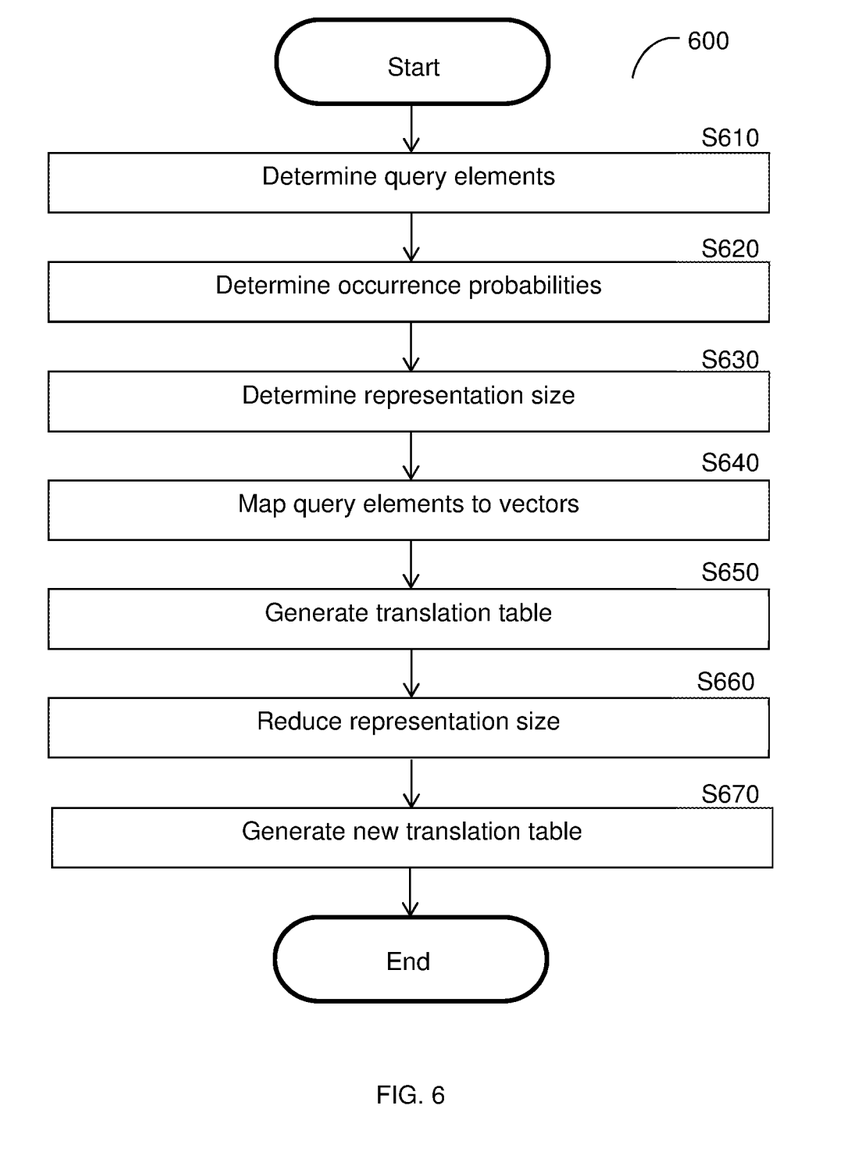
FIG. 6 is a flowchart illustrating a method for utilizing a neural network for query result approximation according to an embodiment.

FIG. 6 is a flowchart illustrating a method for representing query elements in a neural network according to an embodiment. In an embodiment, the method is performed by the ANN system 320, FIG. 3.

At S610, query elements to be represented are determined to be inputs for a neural network based on a set of training queries. Each query element may be, but is not limited to, a predicate, an expression, a variable, a variable value, a query result, and the like. The query elements are identified in the training queries.

At optional S620, occurrence probabilities are determined for the query elements. In an embodiment, S620 includes determining a number of occurrences of each query element in the training queries. The occurrence probability for each query element may then be determined based on the number of distinct query elements and the number of occurrences of the query element.

In an embodiment, the occurrence probabilities are utilized to determine whether reduced representations should be used, which query elements should have reduced representations, or both.

At S630, a representation size is determined. The representation size is a number of distinct vectors (e.g., permutations and combinations of bits) to be used to represent the query elements. In an embodiment, the representation size is selected from among known representation sizes based on the possible permutations and combinations of values used for the vectors. In an example implementation, the representation size is a bit representation size, i.e., a number of bits. In such an example, a 4-bit representation size provides 16 distinct representations (i.e., 16 distinct permutations and combinations of 4 bits).

In an embodiment, the representation size is determined based on the number of distinct query elements to be represented and the number of query elements that can be represented by each representation size. The number of distinct query elements to be represented may be, but is not limited to, a number of known query elements, a number determined based on the highest value among query elements having numerical values (e.g., variable values with a highest value of 239 would need an 8-bit vector to represent all possible variable values from 0 to 239), and the like.

In a further embodiment, for each query element, it is determined if the query element should have a reduced representation based on its occurrence probability. In an example implementation, each query element having an occurrence probability below a threshold may have a reduced representation.

As a non-limiting example, when the representation sizes are numbers of bits and a set of 17 query elements (e.g., 11 variable values and 6 expressions) is to be represented, the possible representation sizes to be used would be either 4-bit representation (i.e., supporting 16 distinct query elements) or 5-bit representation (i.e., supporting 32 distinct query elements). If one or more of the query elements has an occurrence probability below a threshold, the smaller representation size of 4 bits may be used and the representation may be reduced as described herein. Otherwise, the larger representation size of 5 bits may be used.

At S640, each query element is mapped to a vector. Each vector is a representation of its assigned query elements and can be processed by a neural network (e.g., the neural network 115, FIG. 1). To this end, each vector may be unique to a query element (i.e., assigned to a single query element), or may be a non-unique vector (i.e., assigned to more than one query element, for example when a reduced representation is used).

When the number of distinct query elements is greater than the determined representation size, S640 further includes selecting one or more of the query elements to have reduced representations. In an embodiment, the selection is based on the occurrence probabilities, the type of query element, or both. Query elements may be selected such that the lowest probability query elements have reduced representations, such that the lowest probability variable values are paired with the highest probability predicates and expressions in reduced representations, both, and the like.

At S650, a translation table is generated based on the mapping of vectors. The translation table maps each vector to its respective query elements.

In an embodiment, the translation table presents a reduced representation of the query elements. The reduced representation translation table includes fewer distinct vectors than the number of determined query elements. To this end, the reduced representation is realized by leaving one or more of the query elements unrepresented (i.e., such that each of the unrepresented query elements is not mapped to any vector), by mapping multiple query elements to the same vector, or both.

At optional S660, the representation size may be reduced. The representation size may be reduced when, for example, reduction in use of memory is required or otherwise when computing resources need to be conserved. The reduction may include selecting a smaller representation size, and may be further based on the degree to which computing resources should be conserved.

At optional S670, a new translation table is generated based on the reduced representation size determined at S660.

It should be noted that various embodiments described herein are discussed with respect to a particular example in which a 5-bit numerical representation is reduced to a 4-bit numerical representation, but that the disclosed embodiments may be equally applicable to different reductions of representations. What numerical representation scheme (e.g., a scheme using bits versus other numerical values to represent query elements, the number of numerical values used to represent query elements, and the like) is applied may depend on the desired performance of query processing and the degree of acceptability of potential data loss.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for representing query elements in an artificial neural network, comprising:
    generating a first translation table based on a plurality of query elements, wherein the first translation table maps the plurality of query elements to a plurality of vectors, wherein at least two first query elements of the plurality of query elements are mapped to a first vector of the plurality of vectors such that a number of distinct query elements among the plurality of query elements is greater than a number of distinct vectors among the plurality of vectors;
    reducing a representation size, wherein reducing the representation size includes determining at least two second query elements of the plurality of query elements to be represented by a second vector of the plurality of vectors;
    generating a second translation table based on the reduced representation size, wherein the at least two second query elements are mapped to the second vector in the second translation table;
    converting a plurality of input query elements into respective numerical representations using the second translation table; and
    generating a result for a database query by sending the database query to a neural network, wherein the database query is based on the numerical representations.

2. The method of claim 1, further comprising:
    determining a representation size based on the number of distinct query elements, wherein the representation size indicates a number of vectors to which the plurality of query elements can be mapped, wherein the translation table is generated based further on the representation size.

3. The method of claim 2, wherein each of the plurality of query elements has an occurrence probability, wherein the representation size is determined based further on the occurrence probabilities of the plurality of query elements.

4. The method of claim 3, further comprising:
    determining the occurrence probability for each of the plurality of query elements based on a set of training query elements.

5. The method of claim 1, further comprising:
    translating a plurality of queries and a plurality of query results into the plurality of vectors, wherein each query corresponds to one of the plurality of query results, wherein each query and its corresponding query result is translated into one of the plurality of vectors.

6. The method of claim 1, wherein each of the plurality of query elements has an occurrence probability, wherein one of the at least two first query elements has a lowest occurrence probability among the occurrence probabilities of the plurality of query elements.

7. A non-transitory computer readable medium having stored thereon instructions for causing a processing circuitry to execute a process, the process comprising:
    generating a first translation table based on a plurality of query elements, wherein the first translation table maps the plurality of query elements to a plurality of vectors, wherein at least two first query elements of the plurality of query elements are mapped to a first vector of the plurality of vectors such that a number of distinct query elements among the plurality of query elements is greater than a number of distinct vectors among the plurality of vectors;
    reducing a representation size, wherein reducing the representation size includes determining at least two second query elements of the plurality of query elements to be represented by a second vector of the plurality of vectors;
    generating a second translation table based on the reduced representation size, wherein the at least two second query elements are mapped to the second vector in the second translation table;
    converting a plurality of input query elements into respective numerical representations using the second translation table; and
    generating a result for a database query by sending the database query to a neural network, wherein the database query is based on the numerical representations.

8. A system for representing query elements in an artificial neural network, comprising:
    a processing circuitry; and
    a memory, the memory containing instructions that, when executed by the processing circuitry, configure the system to:
    generate a first translation table based on a plurality of query elements, wherein the first translation table maps the plurality of query elements to a plurality of vectors, wherein at least two first query elements of the plurality of query elements are mapped to a first vector of the plurality of vectors such that a number of distinct query elements among the plurality of query elements is greater than a number of distinct vectors among the plurality of vectors;
    reduce a representation size, wherein reducing the representation size includes determining at least two second query elements of the plurality of query elements to be represented by a second vector of the plurality of vectors;
    generate a second translation table based on the reduced representation size, wherein the at least two second query elements are mapped to the second vector in the second translation table;
    convert a plurality of input query elements into respective numerical representations using the second translation table; and
    generate a result for a database query by sending the database query to a neural network, wherein the database query is based on the numerical representations.

9. The system of claim 8, wherein the system is further configured to:
    determine a representation size based on the number of distinct query elements, wherein the representation size indicates a number of vectors to which the plurality of query elements can be mapped, wherein the translation table is generated based further on the representation size.

10. The system of claim 9, wherein each of the plurality of query elements has an occurrence probability, wherein the representation size is determined based further on the occurrence probabilities of the plurality of query elements.

11. The system of claim 10, wherein the system is further configured to:
determine the occurrence probability for each of the plurality of query elements based on a set of training query elements.

12. The system of claim 8, wherein the system is further configured to:
translate a plurality of queries and a plurality of query results into the plurality of vectors, wherein each query corresponds to one of the plurality of query results, wherein each query and its corresponding query result is translated into one of the plurality of vectors.

13. The system of claim 8, wherein each of the plurality of query elements has an occurrence probability, wherein one of the at least two first query elements has a lowest occurrence probability among the occurrence probabilities of the plurality of query elements.

14. A method for representing query elements in an artificial neural network, comprising:
generating a first translation table based on a plurality of query elements, wherein the first translation table maps the plurality of query elements to a plurality of vectors, wherein at least one first query element of the plurality of query elements is unrepresented in the first translation table such that a number of distinct query elements among the plurality of query elements is greater than a number of distinct vectors among the plurality of vectors;
reducing a representation size, wherein reducing the representation size includes determining at least two second query elements of the plurality of query elements to be represented by a second vector of the plurality of vectors;
generating a second translation table based on the reduced representation size, wherein the at least two second query elements are mapped to the second vector in the second translation table;
converting a plurality of input query elements into respective numerical representations using the second translation table; and
generating a result for a database query by sending the database query to a neural network, wherein the database query is based on the numerical representations.

15. The method of claim 14, further comprising:
determining a representation size based on the number of distinct query elements, wherein the representation size indicates a number of vectors to which the plurality of query elements can be mapped, wherein the translation table is generated based further on the representation size.

16. The method of claim 15, wherein each of the plurality of query elements has an occurrence probability, wherein the representation size is determined based further on the occurrence probabilities of the plurality of query elements.

17. The method of claim 16, further comprising:
determining the occurrence probability for each of the plurality of query elements based on a set of training query elements.

18. The method of claim 14, further comprising:
translating a plurality of queries and a plurality of query results into the plurality of vectors, wherein each query corresponds to one of the plurality of query results, wherein each query and its corresponding query result is translated into one of the plurality of vectors.

19. A non-transitory computer readable medium having stored thereon instructions for causing a processing circuitry to execute a process, the process comprising:
generating a first translation table based on a plurality of query elements, wherein the first translation table maps the plurality of query elements to a plurality of vectors, wherein at least one first query element of the plurality of query elements is unrepresented in the first translation table such that a number of distinct query elements among the plurality of query elements is greater than a number of distinct vectors among the plurality of vectors;
reducing a representation size, wherein reducing the representation size includes determining at least two second query elements of the plurality of query elements to be represented by a second vector of the plurality of vectors;
generating a second translation table based on the reduced representation size, wherein the at least two second query elements are mapped to the second vector in the second translation table;
converting a plurality of input query elements into respective numerical representations using the second translation table; and
generating a result for a database query by sending the database query to a neural network, wherein the database query is based on the numerical representations.

20. A system for representing query elements in an artificial neural network, comprising:
a processing circuitry; and
a memory, the memory containing instructions that, when executed by the processing circuitry, configure the system to:
generate a first translation table based on a plurality of query elements, wherein the first translation table maps the plurality of query elements to a plurality of vectors, wherein at least one first query element of the plurality of query elements is unrepresented in the first translation table such that a number of distinct query elements among the plurality of query elements is greater than a number of distinct vectors among the plurality of vectors;
reduce a representation size, wherein reducing the representation size includes determining at least two second query elements of the plurality of query elements to be represented by a second vector of the plurality of vectors;
generate a second translation table based on the reduced representation size, wherein the at least two second query elements are mapped to the second vector in the second translation table;
convert a plurality of input query elements into respective numerical representations using the second translation table; and
generate a result for a database query by sending the database query to a neural network, wherein the database query is based on the numerical representations.

21. The system of claim 20, wherein the system is further configured to:
determine a representation size based on the number of distinct query elements, wherein the representation size indicates a number of vectors to which the plurality of query elements can be mapped, wherein the translation table is generated based further on the representation size.

22. The system of claim 21, wherein each of the plurality of query elements has an occurrence probability, wherein the representation size is determined based further on the occurrence probabilities of the plurality of query elements.

23. The system of claim 22, wherein the system is further configured to:
   determine the occurrence probability for each of the plurality of query elements based on a set of training query elements.

24. The system of claim 20, wherein the system is further configured to:
   translate a plurality of queries and a plurality of query results into the plurality of vectors, wherein each query corresponds to one of the plurality of query results, wherein each query and its corresponding query result is translated into one of the plurality of vectors.

* * * * *